US006038073A

United States Patent [19]

Ono

[11] Patent Number: 6,038,073

[45] Date of Patent: Mar. 14, 2000

[54] OPTICAL INFORMATION PROCESSING SYSTEM

[75] Inventor: Shuji Ono, Kanagawa-ken, Japan

[73] Assignee: Fuji Photo Film Co., Ltd., Kanagawa-ken, Japan

[21] Appl. No.: 08/246,723

[22] Filed: May 20, 1994

[30] Foreign Application Priority Data

May 21, 1993 [JP] Japan .................................... 5-119795

[51] Int. Cl.[7] ............................ G02B 27/46; G03H 1/16; G06K 9/74; G06K 9/76

[52] U.S. Cl. ............................ 359/561; 359/29; 359/559; 359/107; 382/32; 382/31

[58] Field of Search ............................ 359/29, 107, 108, 359/559, 561; 382/31, 32, 50

[56] References Cited

U.S. PATENT DOCUMENTS

| | | | |
|---|---|---|---|
| 4,862,511 | 8/1989 | Peppers et al. | 359/561 |
| 5,121,228 | 6/1992 | Paek | 359/561 |
| 5,129,041 | 7/1992 | Pernick et al. | 359/107 |
| 5,148,496 | 9/1992 | Anderson | 359/561 |
| 5,151,822 | 9/1992 | Hekker et al. | 359/561 |
| 5,251,052 | 10/1993 | Reyes et al. | 359/107 |
| 5,291,324 | 3/1994 | Hinterlone | 359/107 |
| 5,317,445 | 5/1994 | DeJule et al. | 359/107 |

FOREIGN PATENT DOCUMENTS 4125517 4/1992 Japan .

OTHER PUBLICATIONS

"Lenslet array processors," Applied Optics, vol. 21, No. 7, Apr. 1982, pp. 1271–1280, I. Glazer.

"Optical Neural Networks Based on Error Back–Propagation Learning for Hetro–Association of Two–Dimensional Patterns," International Journal of Optical Computing, vol. 2, No. 4, Dec. 1991, Yuk et al.

"Microlenses for Optical Neural Network," Optoelectronics Devices and Technologies, vol. 8, No. 1, Mar. 1993, Hamanaka et al.

"Parallel Processing Using Microlens Arrays", Hamanaka et al., Microoptics News, May 31, 1991., vol. 9, No. 2, pp. 59–64.

*Primary Examiner*—Audrey Chang
*Attorney, Agent, or Firm*—Sughrue, Mion, Zinn, Macpeak & Seas, PLLC

[57] ABSTRACT

A constituent unit for an optical information processing system comprises an input information displaying device, which one-dimensionally, two-dimensionally, or three-dimensionally displays presented information as an optical pattern. Each of optical correlation operation devices located close to the input information displaying device detects only an optical pattern falling within a predetermined range among the optical pattern displayed on the input information displaying device, and carries out an optical correlation operation in order to calculate correlation between information representing the detected optical pattern and predetermined information having been stored in each optical correlation operation device. Each optical correlation operation device thereafter feeds out the results of the correlation operation. Each of electric operation devices receives the results of the correlation operation from a predetermined number of the optical correlation operation devices, carries out a predetermined operation on the results of the correlation operation, and feeds out the results of the predetermined operation.

27 Claims, 9 Drawing Sheets

OPTICAL INFORMATION PROCESSING SYSTEM

BACKGROUND OF THE INVENTION

1. Field of the Invention

This invention relates to a constituent unit for an optical information processing system. More particularly the present invention relates to an optical information processing system wherein light is utilized as a medium for carrying information and a constituent unit group for such an optical information processing system. This invention also relates to an optical information processing system which utilizes the constituent unit or the constituent unit group.

2. Description of the Prior Art

A typical approach in the fields of optical computing and optical information processing is to carry out large-scaled parallel processing on two-dimensional patterns by utilizing the characteristics that the light can travel quickly and can be processed in parallel. In such cases, predetermined optical parallel processing is often carried out by simultaneously forming multiple images from an input pattern and carrying out a different image operation on each of the multiple images. Examples of such processing include parallel operations for calculating the sum of products of a matrix and a vector, which operations form the foundation of a neural network, and parallel operations for calculating the levels of correlation between an input image and comparative images in pattern recognition. By way of example, a multiple imaging optical system shown in FIG. 18 is one of basic components in optical parallel processing.

Various multiple imaging optical systems have heretofore been proposed with respect both incoherent illumination and coherent illumination. For the processing under incoherent illumination, the image forming performance is rated with respect to a multiple imaging optical system which utilizes a lens array. For the processing under coherent illumination, various devices, such as a Dammann grating, a two-dimensional phase grating, a hologram device, and a pinhole array self-imaging device, have heretofore been proposed. The multiple imaging optical systems are applied to parallel operations for calculating the sum of products of a matrix and a vector, parallel optical connection utilizing the operations for calculating the sum of products of a matrix and a vector, parallel matched filtering, and the like.

Also, application of a multiple imaging optical system, which utilizes a microlens array, to optical parallel processing has been proposed by Hamanaka, et al. in "Parallel Processing Using Microlens Arrays," MICROOPTICS NEWS, Bulletin of Microoptics Research Group, 1991.5.31, Vol. 9, No. 2, pp. 59–64. However, the system for the optical parallel processing has the drawbacks in that the alignment of the parts of the system must be adjusted accurately, and the system is difficult to assemble and adjust. Also, an optical information transmitter shown in FIG. 19 has been proposed in Japanese Unexamined Patent Publication No. 4(1992)-125517. As illustrated in FIG. 19, the proposed optical information transmitter comprises a rod lens 108 and a plate microlens array (hereinafter referred to as PML) 109, which are adhered and secured to each other and constitute a multiple imaging optical system. A transmission type of spatial light modulator (hereinafter referred to as SLM) 110, which displays an input image, is located on the front surface of the multiple imaging optical system, (i.e. on the light entry surface of the rod lens 108) such that the SLM 110 may be in close contact with and secured to the light entry surface of the rod lens 108. Also, an incoherent illumination device 111 (e.g. a packaged LED array) is located at the back of the SLM 110 such that the incoherent illumination device 111 may be in close contact with and secured to the SLM 110.

A reference pattern array 106 is located on a light radiating surface of the PML 109 such that the reference pattern array 106 may be in close contact with and secured to the light radiating surface of the PML 109. Further, a detector array 107 is located at the back of the reference pattern array 106 such that the detector array 107 may be in close contact with and secured to the reference pattern array 106.

With the optical system described above, the adjustment and fixing of the alignment of the optical system, which were very difficult to carry out, can be achieved very easily.

Also, with the optical system described above, for example, in cases where a character image is displayed on the SLM 110 and patterns of reference characters are formed on the reference pattern array 106, comparison signals representing the results of comparison between the input character image and the plurality of the patterns of the reference characters can be detected simultaneously and in parallel by the detector array 107. In cases where the input image is a vector and a matrix is formed on the reference pattern array 106, the results of the operations for calculating the sum of products of the vector and the matrix can be detected by the detector array 107.

However, with the multiple imaging optical system described above, the input image displayed over the entire region of the SLM 110 must be totally connected such that it may be fed into every small region on the detector array 107. Therefore, the distance between the arrays, such as the lens array, which constitute the optical system, must be comparatively long. Accordingly, even if the optical system described above can process the information representing two-dimensional patterns by utilizing the characteristics that the light can travel quickly and can be processed in parallel, the optical system described above cannot be kept small in size.

SUMMARY OF THE INVENTION

The primary object of the present invention is to provide a constituent unit for an optical information processing system, which constituent unit is capable of keeping the optical information processing system compact.

Another object of the present invention is to provide a constituent unit group for an optical information processing system, which constituent unit group is capable of keeping the optical information processing system compact.

A further object of the present invention is to provide an optical information processing system, which is compact.

A still further object of the present invention is to provide an optical information processing system, which is capable of accurately processing a large amount of optical pattern information.

The present invention provides a first constituent unit for an optical information processing system, the constituent unit comprising:

i) an input information displaying means, which one-dimensionally, two-dimensionally, or three-dimensionally displays presented information as an optical pattern, ii) a plurality of optical correlation operation means, which are located close to the input information displaying means, each of the plurality of the optical correlation operation means detecting only an optical pattern, which falls within a predetermined range among the optical pattern displayed on the input information displaying means, carrying out an optical correlation operation in order to calculate correlation between information representing the detected optical pattern and predetermined information having been stored in each of the plurality of the optical correlation operation means, and thereafter feeding out the results of the correlation operation, and iii) a plurality of electric operation means, each of which receives the results of the correlation operation having been fed out of a predetermined number of the optical correlation operation means among the plurality of the optical correlation operation means, carries out a predetermined operation on the results of the correlation operation received from the predetermined number of the optical correlation operation means, and feeds out the results of the predetermined operation.

The present invention also provides a second constituent unit for an optical information processing system, wherein the first constituent unit for an optical information processing system in accordance with the present invention is modified such that each of the plurality of the optical correlation operation means may comprise:

a) an optical mask, which stores the predetermined information and has light transmission characteristics in accordance with the predetermined information having been stored therein, b) an optical information transfer means for transferring the information representing the optical pattern, which falls within the predetermined range among the optical pattern displayed on the input information displaying means, to the optical mask, and c) a light receiving means, which receives an optical pattern representing the optical intensity product of the information representing the optical pattern passing through the optical mask and the predetermined information having been stored in the optical mask, whereby the light receiving means detects the total optical intensity of the optical pattern representing the optical intensity product and generates an electric signal in accordance with the total optical intensity.

The present invention further provides a third constituent unit for an optical information processing system, wherein the first constituent unit for an optical information processing system in accordance with the present invention is modified such that each of the plurality of the optical correlation operation means may comprise:

a) an optical mask, which stores the predetermined information and has light transmission characteristics in accordance with the predetermined information having been stored therein, b) an optical information transfer means for transferring the information representing the optical pattern, which falls within the predetermined range among the optical pattern displayed on the input information displaying means, to the optical mask, and c) a light receiving means, which receives an optical pattern representing the optical intensity product of the information representing the optical pattern passing through the optical mask and the predetermined information having been stored in the optical mask, whereby the light receiving means detects the total optical intensity of the optical pattern representing the optical intensity product and feeds out an electric signal in accordance with the total optical intensity, and each of the plurality of the electric operation means comprises an operation means for carrying out an operation on the electric signal received from the light receiving means and an electric signal received from at least a single light receiving means, which is other than the light receiving means and belongs to one of the plurality of the optical correlation operation means, an electric signal corresponding to the results of the operation carried out on the plurality of the electric signals being thereby fed out of the operation means.

The present invention still further provides a fourth constituent unit for an optical information processing system, wherein the first constituent unit for an optical information processing system in accordance with the present invention is modified such that the constituent unit may further comprise an optical signal group output means, which receives the results of the operations from the plurality of the electric operation means and feeds out a group of optical signals in accordance with the results of the operations received from the plurality of the electric operation means.

The present invention also provides a constituent unit group for an optical information processing system, the constituent unit group comprising a plurality of the aforesaid fourth constituent units for an optical information processing system in accordance with the present invention and a single first constituent unit for an optical information processing system in accordance with the present invention, wherein the plurality of the fourth constituent units for an optical information processing system in accordance with the present invention are associated with one another such that the group of the optical signals having been fed out of one of the plurality of the fourth constituent units for an optical information processing system in accordance with the present invention may be fed successively into a single other constituent unit among the plurality of the fourth constituent units for an optical information processing system in accordance with the present invention, and wherein the constituent unit at the last stage among the plurality of the fourth constituent units for an optical information processing system in accordance with the present invention is associated with the single first constituent unit for an optical information processing system in accordance with the present invention such that the group of the optical signals having been fed out of the constituent unit at the last stage may be fed into the single first constituent unit for an optical information processing system in accordance with the present invention.

Also, in a constituent unit group for an optical information processing system in accordance with the present invention, a single fourth constituent unit for an optical information processing system in accordance with the present invention may be associated with a single first constituent unit for an optical information processing system in accordance with the present invention such that the group of the optical signals having been fed out of the single fourth constituent unit for an optical information processing system in accordance with the present invention may be fed in parallel into the single first constituent unit for an optical information processing system in accordance with the present invention. Alternatively, a single fourth constituent unit for an optical information processing system in accordance with the present invention may be associated with a plurality of first constituent units for an optical information processing system in accordance with the present invention such that the group of the optical signals having been fed out of the single fourth constituent unit for an optical information processing system in accordance with the present invention may be fed in parallel into the plurality of the first constituent units for an optical information processing system in accordance with the present invention. As another alternative, groups of the optical signals having been fed out of a plurality of fourth constituent units for an optical information processing system in accordance with the present invention may be fed in parallel into a single first constituent unit for an optical information processing system in accordance with the present invention.

Further, the aforesaid fourth constituent unit for an optical information processing system in accordance with the present invention may be associated with an information mixing means for mixing the group of the optical signals, which have been fed out of the constituent unit, in a predetermined proportion into a signal, which is fed into the constituent unit, and an information group re-entry means for feeding the mixed signals into the constituent unit.

In the aforesaid constituent unit group for an optical information processing system in accordance with the present invention, the optical signal group output means of the fourth constituent unit for an optical information processing system in accordance with the present invention may also serve as the input information displaying means of the single first constituent unit for an optical information processing system in accordance with the present invention, which single first constituent unit receives the group of the optical signals having been fed out of the optical signal group output means.

The present invention further provides an optical information processing system comprising at least a single fourth constituent unit for an optical information processing system in accordance with the present invention or at least a single constituent unit group for an optical information processing system in accordance with the present invention, wherein the respective constituent units or the respective constituent unit groups are associated with one another such that the group of the optical signals having been fed out of one of the respective constituent units or one of the respective constituent unit groups may be fed successively into a single other constituent unit among the respective constituent units or into a single other constituent unit group among the respective constituent unit groups.

The present invention still further provides an optical information processing system, wherein the constituent unit at the last stage of the aforesaid optical information processing system in accordance with the present invention is associated with the first, second, or third constituent unit for an optical information processing system in accordance with the present invention such that the group of the optical signals having been fed out of the constituent unit at the last stage may be fed into the first, second, or third constituent unit for an optical information processing system in accordance with the present invention.

With the constituent unit for an optical information processing system in accordance with the present invention, a plurality of the optical correlation operation means are located close to the input information displaying means. Each of the plurality of the optical correlation operation means detects only an optical pattern, which falls within a predetermined range among the optical pattern displayed on the input information displaying means. Therefore, with each of the plurality of the optical correlation operation means, instead of the optical correlation operation being carried out on the entire information of the optical pattern displayed on the input information displaying means, the optical correlation operation can be carried out only on the local information of the optical pattern displayed on the input information displaying means. Accordingly, the distance between the input information displaying means and the optical correlation operation means can be kept short. As a result, the constituent unit group utilizing the constituent unit for an optical information processing system in accordance with the present invention and the optical information processing system in accordance with the present invention can be kept compact.

With the optical information processing system in accordance with the present invention, the operation is carried out on the local information of the optical pattern displayed on the input information displaying means. Therefore, even if the amount of the information of a two-dimensional image to be processed is large, no distortion occurs in the information corresponding to peripheral regions of the image. Accordingly, the amount of the information to be processed can be increased infinitely in two-dimensional directions. Also, the respective constituent units can be arbitrarily associated with one another. Therefore, the respective constituent units can be associated with one another in space-variant manners.

Also, with the constituent unit group for an optical information processing system in accordance with the present invention, wherein the optical signal group output means of the fourth constituent unit for an optical information processing system in accordance with the present invention also serves as the input information displaying means of the single first constituent unit for an optical information processing system in accordance with the present invention, which single first constituent unit receives the group of the optical signals having been fed out of the optical signal group output means, the optical information processing system can be kept more compact.

Further, with the optical information processing system in accordance with the present invention wherein the operation is carried out on the local information of the optical pattern displayed on the input information displaying means, the constituent units can be located in a three-dimensional pattern. Therefore, operations for processing on various coordinate systems, such as processing on a polar coordinate system and processing on a spherical coordinate system, which were difficult to carry out in the past, can be carried out with the optical information processing system in accordance with the present invention.

DESCRIPTION OF THE PREFERRED EMBODIMENTS

The present invention will hereinbelow be described in further detail with reference to the accompanying drawings.

Figure 1:
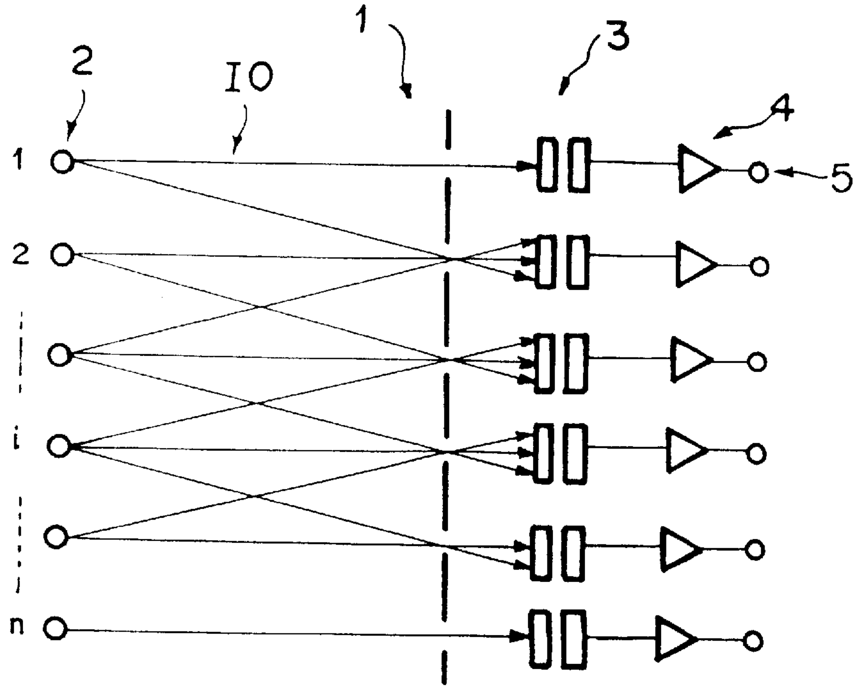
FIG. 1 is an explanatory view showing a first embodiment of the constituent unit for an optical information processing system in accordance with the present invention.

FIG. 1 is an explanatory view showing a first embodiment of the constituent unit for an optical information processing system in accordance with the present invention. As illustrated in FIG. 1, a constituent unit 1 for an optical information processing system in accordance with the present invention comprises an input information displaying means 2, which one-dimensionally or two-dimensionally displays presented information as an optical pattern I0. The constituent unit 1 also comprises a plurality of optical correlation operation means 3, 3, . . . , which are located close to the input information displaying means 2. Each of the plurality of the optical correlation operation means 3, 3, . . . detects only an optical pattern, which falls within a predetermined range among the optical pattern I0 displayed on the input information displaying means 2. Also, each of the plurality of the optical correlation operation means 3, 3, . . . carries out an optical correlation operation in order to calculate correlation between the information representing the detected optical pattern and predetermined information having been stored in each of the plurality of the optical correlation operation means 3, 3, . . . and thereafter feeds out the results of the correlation operation. The constituent unit 1 further comprises a plurality of electric operation means 4, 4, . . . Each of the plurality of the electric operation means 4, 4, . . . receives the results of the correlation operation having been fed out of a single optical correlation operation means 3 among the plurality of the optical correlation operation means 3, 3, . . . and carries out a predetermined operation on the results of the correlation operation received from the single optical correlation operation means 3. The constituent unit 1 still further comprises a plurality of output means 5, 5, . . . , each of which feeds out the results of the predetermined operation obtained from the corresponding electric operation means 4.

In FIG. 1, as an aid in facilitating the explanation the input information displaying means 2, the optical correlation operation means 3, 3, . . . , the electric operation means 4, 4, . . . , and the output means 5, 5, . . . are illustrated in a one-dimensional array.

How the optical correlation operation means 3, 3, . . . , the electric operation means 4, 4, . . . , and the output means 5, 5, . . . work will be described hereinbelow.

Figure 2:
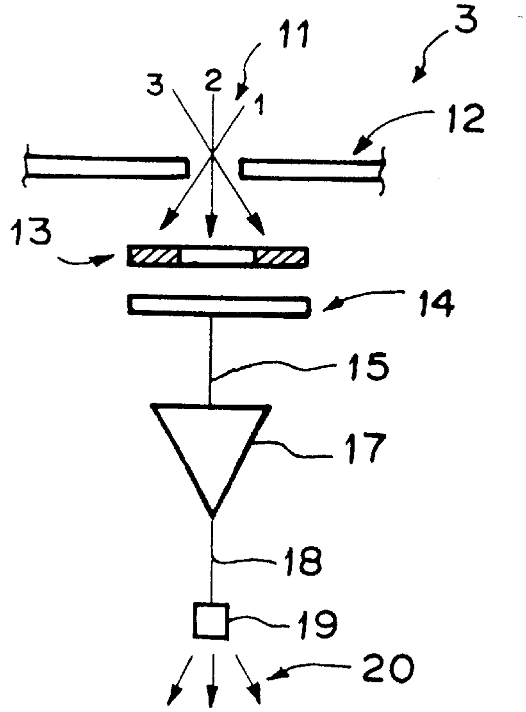
FIG. 2 is an explanatory view showing a first example of an optical correlation operation means, which constitutes the constituent unit for an optical information processing system in accordance with the present invention.

FIG. 2 shows first examples of the optical correlation operation means 3, the electric operation means 4, and the output means 5, which constitute the constituent unit 1 for an optical information processing system in accordance with the present invention. As illustrated in FIG. 2, each optical correlation operation means 3 comprises a pinhole means 12 for receiving local optical pattern information 11, which is among the optical pattern information 10 given by the input information displaying means 2. The input information displaying means 2 may be constituted of a light emitting device array, a display device, a liquid crystal device array, or the like, which is capable of displaying an optical pattern. The optical correlation operation means 3 also comprises a mask 13, which stores predetermined information in order to weight the optical pattern information 11 passing through the pinhole means 12. The optical correlation operation means 3 further comprises a light receiving means 14, which receives an optical pattern representing the optical intensity product of the optical pattern information 11 and the predetermined information having been stored in the mask 13. The light receiving means 14 thereby detects the total optical intensity of the optical pattern representing the optical intensity product and generates a correlation signal 15 in accordance with the total optical intensity. The electric operation means 4 comprises an operation means 17, which receives the correlation signal 15 obtained from the light receiving means 14 of the optical correlation operation means 3. The operation means 17 then carries out a predetermined operation on the correlation signal 15 and generates an electric signal 18 representing the results of the operation. The output means 5 comprises a light emitting device 19, which emits light in accordance with the electric signal 18 fed out of the operation means 17.

As described above, each of the optical correlation operation means 3, 3, . . . receives the local optical pattern information 11, which is among the optical pattern information 10 given by the input information displaying means 2. Specifically, the single optical correlation operation means 3 does not receive the entire information of the optical pattern 10, which is radiated out of the input information displaying means 2. As illustrated in FIG. 2, by way of example, the single optical correlation operation means 3 receives only the pieces of optical pattern information 1, 2, and 3, which are among the optical pattern information 10 given by the input information displaying means 2.

Also, each of the optical correlation operation means 3, 3, . . . carries out the product sum operation described below. Specifically, as illustrated in FIG. 2, in cases where the single optical correlation operation means 3 receives three pieces of optical pattern information, which are among the optical pattern information given by the input information displaying means 2, the product sum operation is carried out with the formula $$V_k \sum_{n=-1,0,1} I_{k+n} \cdot m_n$$

wherein pieces of the predetermined information stored in the mask are represented by $m_{-1}$, $m_0$, and $m_1$, the three pieces of the local optical pattern information 11, which are among the optical pattern information 10 given by the input information displaying means 2, are represented by $I_{k-1}$, $I_k$, and $I_{k+1}$, and $V_k$ represents the correlation signal 15 fed out of the optical correlation operation means 3.

The mask 13 may store various kinds of information and may be utilized as an unsharp mask, a weighting mask, or the like.

When the local optical pattern information 11, which has been radiated out of the input information displaying means 2, is given to the optical correlation operation means 3, the local optical pattern information 11 is irradiated through the pinhole means 12 to the mask 13. Within the mask 13, the optical pattern information 11 is weighted in accordance with the predetermined information stored in the mask 13, and the operation for calculating the optical intensity product of the local optical pattern information 11 and the information having been stored in the mask 13 is effected. In this manner, the optical pattern representing the optical intensity product is obtained from the mask 13. The optical pattern representing the optical intensity product is received by the light receiving means 14, and the total optical intensity of the optical pattern representing the optical intensity product is thereby detected. Specifically, the operation for calculating the sum of the products of the local optical pattern information 11 and the information having been stored in the mask 13, i.e. the operation for calculating the intensity of correlation between the local optical pattern information 11 and the information stored in the mask 13, is carried out. In this manner, the correlation signal 15 is generated in accordance with the intensity of correlation. The operation means 17 receives the correlation signal 15 and carries out an operation on the correlation signal 15. The operation means 17 thus generates the electric signal 18 corresponding to the results of the operation. The light emitting device 19 emits light in accordance with the electric signal 18, and an optical pattern 20 representing the results of the operation is thus radiated out of the light emitting device 19.

The operation means 17 may carry out simple addition and subtraction processing. Alternatively, the operation means 17 may carry out nonlinear processing, threshold value processing, or the like.

As illustrated in FIG. 1, the plurality of the optical correlation operation means 3, 3, . . . having the functions described above are located in a one- or two-dimensional array together with the input information displaying means 2. In this manner, the constituent unit 1 for an optical information processing system is formed. A plurality of the constituent units may be associated with one another such that the optical pattern radiated out of a constituent unit may be successively given to a next constituent unit. In this manner, the optical information processing system in accordance with the present invention can be constructed.

Figure 3:
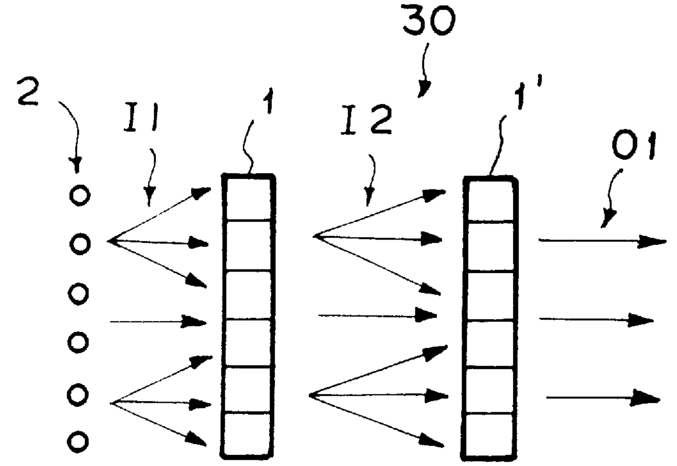
FIG. 3 is an explanatory view showing a first embodiment of the optical information processing system in accordance with the present invention.

FIG. 3 shows a first embodiment of the optical information processing system in accordance with the present invention. In this embodiment, the constituent unit 1 for the optical information processing system, which has the structure shown in FIG. 1, is associated with a constituent unit 1' having the same structure as the constituent unit 1.

As illustrated in FIG. 3, an optical information processing system 30, comprises the constituent units 1 and 1' for the optical information processing system 30. The constituent units 1 and 1' are associated with each other such that the optical pattern radiated out of the constituent unit 1 may be given to the constituent unit 1'.

Optical pattern information I1 is radiated out of the input information displaying means 2. The optical pattern information I1 is given to the constituent unit 1 for the optical information processing system. The operation is carried out in the same manner as that described above, and an optical pattern I2 representing the results of the operation is radiated out of the constituent unit 1. The optical pattern I2 is given to the constituent unit 1' for the optical information processing system. The operation is carried out on the optical pattern I2 in the same manner as that in the constituent unit 1, and an optical pattern O1 representing the final results of the operation is radiated out of the constituent unit 1'.

With the optical information processing system 30, processing on the local information is carried out at any point in the constituent units 1 and 1'. Therefore, the distance between the constituent units 1 and 1' can be kept short, and the optical information processing system 30 can be kept compact. Also, even if the amount of the optical pattern information to be processed becomes large, processing can be carried out on the entire information. Further, no distortion occurs in the information corresponding to peripheral regions of the optical pattern, and the amount of light at the peripheral regions of the optical pattern does not become small.

Moreover, with the optical information processing system in accordance with the present invention, only the local information of the optical pattern may be processed in each optical correlation operation means. Therefore, the aforesaid mask need not necessarily have a very high resolution. For example, in cases where the optical pattern to be processed carries 1,000×1,000 information and is processed with a total connection type of optical information processing system wherein processing is carried out on the entire optical pattern, a mask having a 1,000×1,000 resolution must be prepared. However, in cases where the optical pattern to be processed carries 1,000×1,000 information and is processed with the optical information processing system wherein processing is carried out on the local information of the optical pattern, masks having a markedly lower (e.g., approximately 15×15) resolution may be prepared. Therefore, the constituent unit for the optical information processing system in accordance with the present invention can be constructed easily.

A second embodiment of the optical information processing system in accordance with the present invention will be described hereinbelow.

Figure 4:
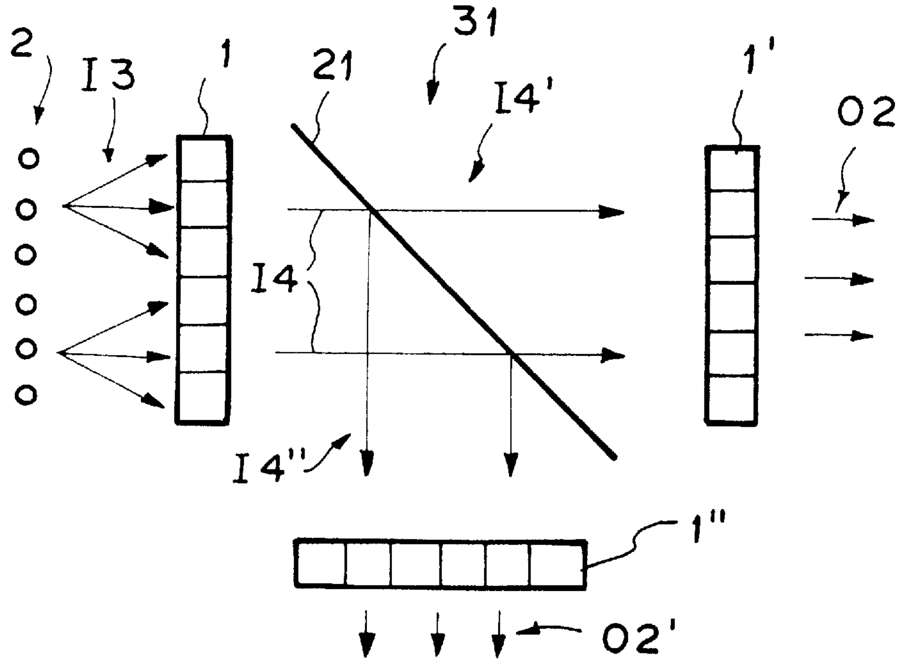
FIG. 4 is an explanatory view showing a second embodiment of the optical information processing system in accordance with the present invention.

FIG. 4 is an explanatory view showing the second embodiment of the optical information processing system in accordance with the present invention.

With reference to FIG. 4, an optical information processing system 31, comprises three constituent units 1, 1', and 1" for the optical information processing system, which have the same structure as that shown in FIG. 1. The constituent unit 1 is associated with the constituent units 1' and 1" such that the optical pattern radiated out of the constituent unit 1 may be fed in parallel into the constituent units 1' and 1".

Optical pattern information I3 is radiated out of the input information displaying means 2. The optical pattern information I3 is given to the constituent unit 1 for the optical information processing system 31. The operation is carried out in the same manner as that described above, and an optical pattern I4 representing the results of the operation is radiated out of the constituent unit 1. The optical pattern I4 is split by a semi-transparent mirror 21 into two groups of correlation information I4' and I4". The two groups of correlation information 14' and I4" are respectively fed into the constituent units 1' and 1" for the optical information processing system. The operations are carried out on the optical patterns I4' and I4" in the same manner as that in the constituent unit 1, and optical patterns O2 and O2' representing the final results of the operations are respectively radiated out of the constituent units 1' and 1".

A third embodiment of the optical information processing system in accordance with the present invention will be described hereinbelow.

Figure 5:
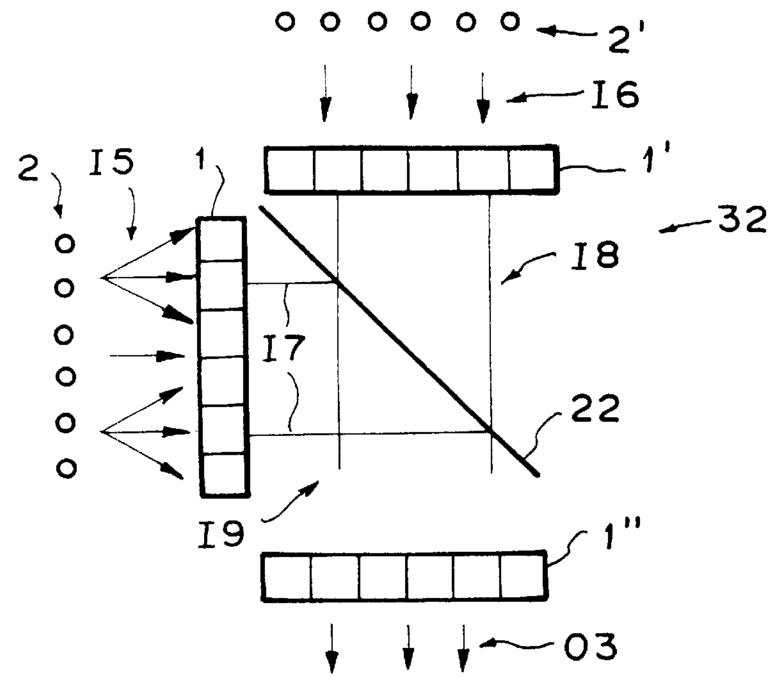
FIG. 5 is an explanatory view showing a third embodiment of the optical information processing system in accordance with the present invention.

FIG. 5 is an explanatory view showing the third embodiment of the optical information processing system in accordance with the present invention.

With reference to FIG. 5, as in the second embodiment of the optical information processing system in accordance with the present invention, an optical information processing system 32, comprises three constituent units 1, 1', and 1" for the optical information processing system 32, which have the same structure as that shown in FIG. 1. The constituent units 1, 1', and 1" are associated with one another such that two optical patterns radiated out of the two constituent units 1 and 1' may be fed into the single constituent unit 1".

Optical pattern information I5 and optical pattern information I6 are respectively radiated out of input information displaying means 2 and 2'. The optical pattern information I5 and the optical pattern information I6 are respectively given to the constituent units 1 and 1' for the optical information processing system. The operations are carried out in the same manner as that described above, and optical patterns I7 and I8 representing the results of the operations are respectively radiated out of the constituent units 1 and 1'. The optical patterns I7 and I8 are combined with each other by a semi-transparent mirror 22 into a single optical pattern I9. The optical pattern I9 is fed into the constituent unit 1" for the optical information processing system. The operation is carried out on the optical pattern I9 in the same manner as those in the constituent units 1 and 1', and an optical pattern O3 representing the final results of the operation is radiated out of the constituent unit 1".

A fourth embodiment of the optical information processing system in accordance with the present invention will be described hereinbelow.

Figure 6:
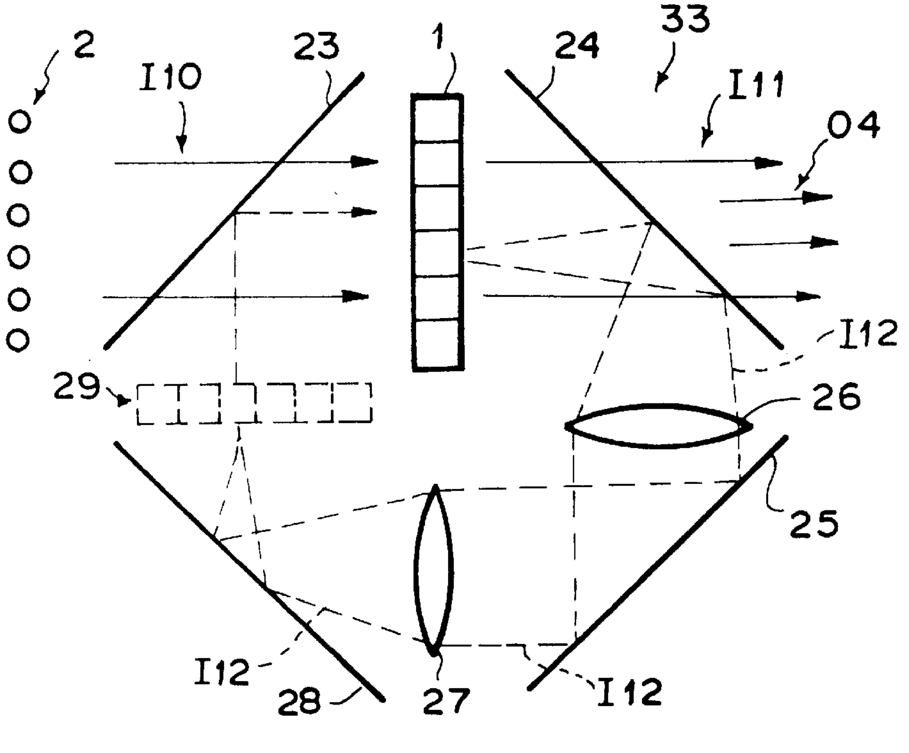
FIG. 6 is an explanatory view showing a fourth embodiment of the optical information processing system in accordance with the present invention.

FIG. 6 is an explanatory view showing the fourth embodiment of the optical information processing system in accordance with the present invention.

With reference to FIG. 6, an optical information processing system 33, comprises the single constituent unit 1 for the optical information processing system, which has the same structure as that shown in FIG. 1. The group of correlation information, which has been radiated out of the constituent unit 1, is again fed into the constituent unit 1, and the product sum operation is repeatedly carried out on the optical pattern.

The fourth embodiment of the optical information processing system in accordance with the present invention is provided with semi-transparent mirrors 23 and 24, mirrors 25 and 28, and lenses 26 and 27. The semi-transparent mirrors 23 and 24, mirrors 25 and 28, and lenses 26 and 27 serve as an information mixing means for mixing a group of correlation information I11, which has been fed out of the constituent unit 1, in a predetermined proportion into a signal I10, which is fed into the constituent unit 1. The semi-transparent mirrors 23 and 24, mirrors 25 and 28, and lenses 26 and 27 also serve as an information group re-entry means for feeding the mixed signals into the constituent unit 1.

The optical pattern information I10 is radiated out of the input information displaying means 2. The optical pattern information I10 is given to the constituent unit 1 for the optical information processing system 33. The operation is carried out in the same manner as that described above, and an optical pattern I11 representing the results of the operation is radiated out of the constituent unit 1. Part of the optical pattern I11 is separated by a semi-transparent mirror 24 as an optical pattern I12 from the optical pattern I11. The optical pattern 112 impinges upon the lens 26 is reflected by the mirror 25, and then passes through the lens 27. The optical pattern I12 is reflected by the mirror 28 and forms an optical image 29. The optical pattern I12, which has formed the optical image 29, is reflected by the semi-transparent mirror 23 and mixed with the optical pattern information I10, which has been radiated out of the input information displaying means 2. In this manner, the optical pattern I12 is again fed into the constituent unit 1, and the operation is again carried out on the optical pattern I12 in the constituent unit 1. These steps are repeated, and the operation in the constituent unit 1 is thereby repeatedly carried out on the optical pattern I12. Therefore, the operation with respect to the information stored in the mask 13 of the constituent unit 1 is carried out repeatedly, and weighting with the mask 13 can thus be carried out recurrently. After the processing described above has been repeated a necessary number of times, an optical pattern O4 representing the final results of the operations is radiated out of the constituent unit 1.

Figure 7:
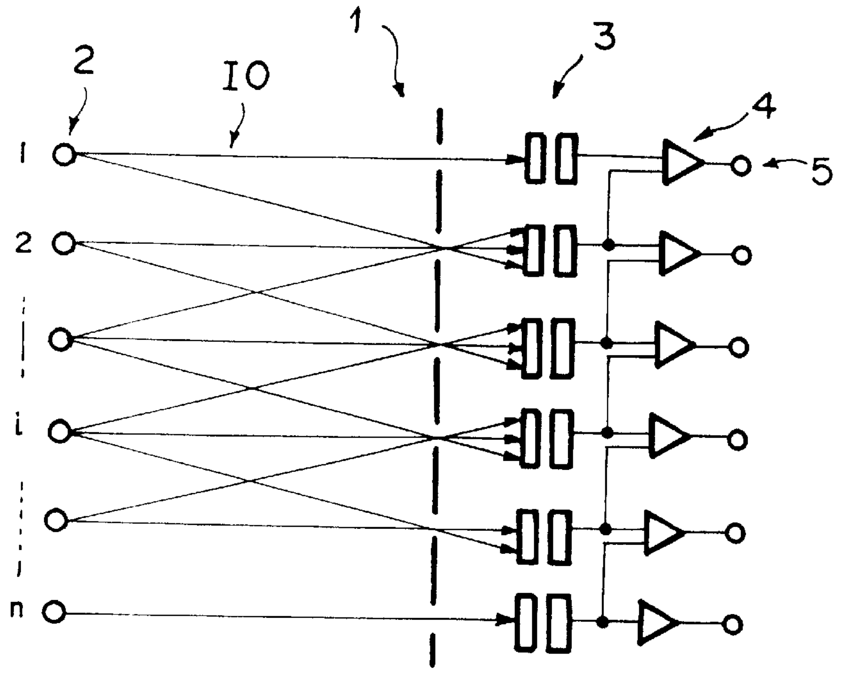
FIG. 7 is an explanatory view showing a second embodiment of the constituent unit for an optical information processing system in accordance with the present invention.
Figure 8:
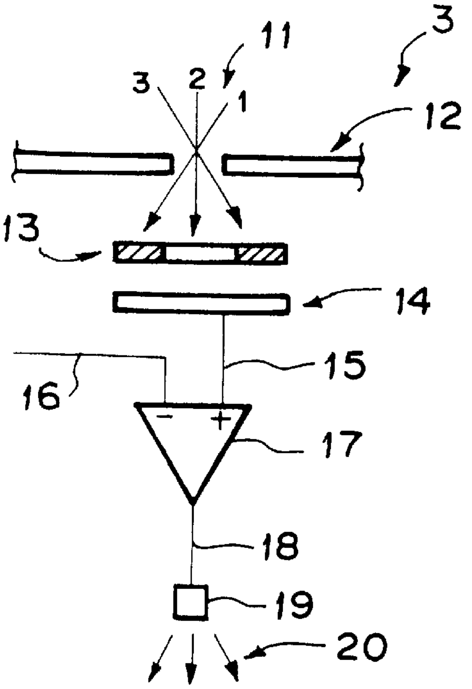
FIG. 8 is an explanatory view showing a second example of an optical correlation operation means, which constitutes the constituent unit for an optical information processing system in accordance with the present invention.

In the embodiments described above, the operation is carried out by the operation means 17 by using only the correlation signal 15, which has been fed out of one light receiving means 14. FIG. 7 is an explanatory view showing a second embodiment of the constituent unit 1 for an optical information processing system in accordance with the present invention. Also FIG. 8 is an explanatory view showing a second example of the optical correlation operation means 3, which constitutes the constituent unit 1 for an optical information processing system in accordance with the present invention. Alternatively, as illustrated in FIGS. 7 and 8, the operation may be carried out by the operation means 17 on the correlation signal 15, which has been fed out of the light receiving means 14, and a correlation signal 16, which has been fed out of a different light receiving means. As another alternative, the operation may be carried out by using correlation signals, which have been fed out of a plurality of other light receiving means. In FIGS. 7 and 8, similar elements are numbered with the same reference numerals with respect to FIGS. 1 and 2.

Also, in the embodiments described above, the correlation information obtained from the optical correlation operation means 3 and the electric operation means 4, which constitute the constituent unit 1 for the optical information processing system, is fed out as light. Alternatively, in cases where the constituent unit 1 is utilized as the one at the final stage of the optical information processing system, the correlation information may be fed out as an electric signal.

Figure 9:
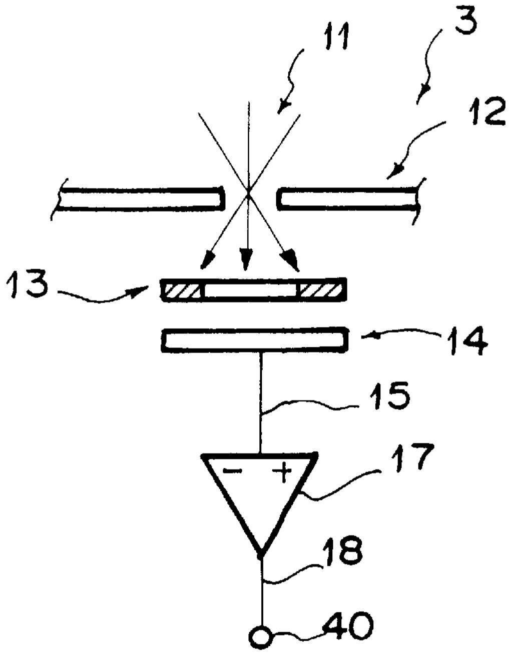
FIG. 9 is an explanatory view showing a third example of an optical correlation operation means, which constitutes the constituent unit for an optical information processing system in accordance with the present invention.

FIG. 9 is an explanatory view showing third examples of the optical correlation operation means 3, the electric operation means 4, and the output means 5, which constitute the constituent unit 1 for the optical information processing system in accordance with the present invention. By way of example, as illustrated in FIG. 9, the light emitting device 19 serving as the output means 5 shown in FIG. 2 may be removed, and a connection terminal 40 may be provided. Also, as in the fourth example of the optical correlation operation means 3, the electric operation means 4, and the output means 5 shown in FIG. 10, the operation means 17 may be connected to an A/D converter 41, which feeds out a digital signal 42. In cases where the A/D converter 41 is thus provided, the results of the operation can be fed out as the digital signal 42.

Figure 10:
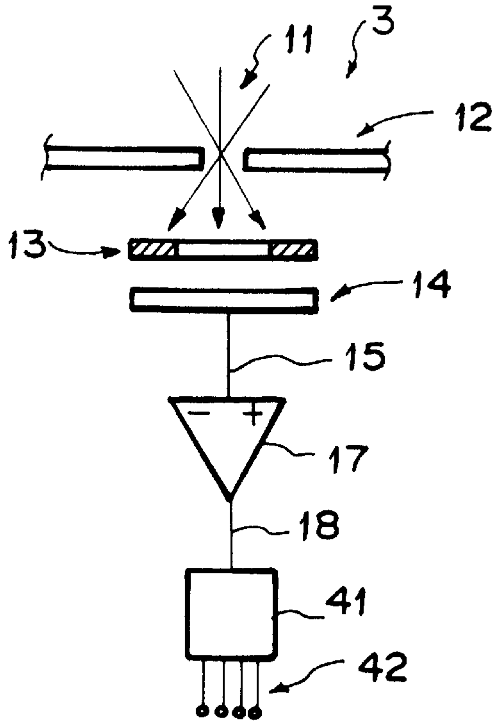
FIG. 10 is an explanatory view showing a fourth example of an optical correlation operation means, which constitutes the constituent unit for an optical information processing system in accordance with the present invention.

In FIGS. 9 and 10, similar elements are numbered with the same reference numerals with respect to FIG. 2.

The aforesaid first to fourth embodiments of the optical information processing system in accordance with the present invention may be combined with one another such that a plurality of kinds of information processing can be carried out.

In the embodiments described above, the pinhole means 12 is employed as the means for receiving the local optical pattern information 11, which is among the optical pattern information I0 radiated out of the input information displaying means 2. Alternatively, any of other means may be utilized as the means for receiving the local optical pattern information 11. For example, a lens may be employed in lieu of the pinhole means.

A fifth example of the optical correlation operation means 3, the electric operation means 4, and the output means 5, which constitute the constituent unit 1 for the optical information processing system in accordance with the present invention, will be described hereinbelow.

Figure 11:
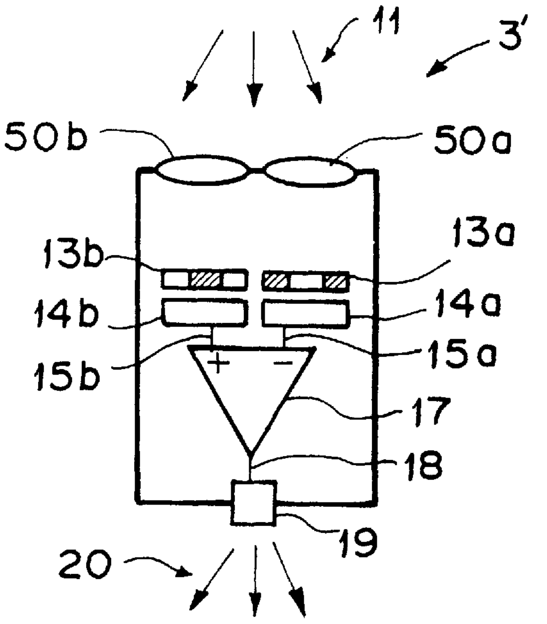
FIG. 11 is an explanatory view showing a fifth example of an optical correlation operation means, which constitutes the constituent unit for an optical information processing system in accordance with the present invention.

FIG. 11 is an explanatory view showing the fifth example of the optical correlation operation means 3, the electric operation means 4, and the output means 5, which constitute the constituent unit 1 for the optical information processing system in accordance with the present invention. The constituent unit 1 is utilized to constitute an optical neural network and carries out an operation on two different correlation signals. As illustrated in FIG. 11, an optical correlation operation means 3' comprises a pair of lenses 50*a* and 50*b* for receiving the local optical pattern information 11, which is among the optical pattern information IO given by the input information displaying means (not shown). The input information displaying means may be constituted of a light emitting device array, a display device, a liquid crystal device array, or the like, which is capable of displaying an optical pattern. The optical correlation operation means 3' also comprises two masks 13*a* and 13*b*, which store predetermined information in order to weight the optical pattern information 11 having passed through the pair of the lenses 50*a* and 50*b*. The optical correlation operation means 3' further comprises light receiving means 14*a* and 14*b*, which receive optical patterns representing the optical intensity products of the local optical pattern information 11 and the predetermined information having been stored in the two masks 13*a* and 13*b*. The light receiving means 14*a* and 14*b* thereby detect the total optical intensities of the optical patterns representing the optical intensity products and generate correlation signals 15*a* and 15*b* in accordance with the total optical intensities. The electric operation means 4 comprises the operation means 17, which receives the correlation signals 15*a* and 15*b* obtained from the light receiving means 14*a* and 14*b*. The operation means 17 then carries out a predetermined operation on the correlation signals 15*a* and 15*b* and generates the electric signal 18 representing the results of the operation. The output means 5 comprises the light emitting device 19, which emits light in accordance with the electric signal 18 fed out of the operation means 17.

In FIG. 11, similar elements are numbered with the same reference numerals with respect to FIG. 2.

When the local optical pattern information 11, which has been radiated out of the input information displaying means 2, is given to the optical correlation operation means 3', the local optical pattern information 11 is irradiated through the pair of the lenses 50*a* and 50*b* to the masks 13*a* and 13*b*. Within the masks 13*a* and 13*b*, the operations for calculating the optical intensity products of the optical pattern information 11 and the information stored in the masks 13*a* and 13*b* are effected. In this manner, the optical patterns representing the optical intensity products are obtained from the masks 13*a* and 13*b*. The optical patterns representing the optical intensity products are received by the light receiving means 14*a* and 14*b*, and the total optical intensities of the optical patterns representing the optical intensity products are thereby detected. Specifically, the operations for calculating the sums of the products of the optical pattern information 11 and the information having been stored in the masks 13*a* and 13*b* (i.e. the operations for calculating the intensities of correlation between the local optical pattern information 11 and the information having been stored in the masks 13*a* and 13*b*) are carried out. In this manner, the correlation signals 15*a* and 15*b* are generated in accordance with the intensities of correlation. The operation means 17 receives the correlation signals 15*a* and 15*b* and carries out an operation on the correlation signals 15*a* and 15*b*. The operation means 17 thus generates the electric signal 18 corresponding to the results of the operation. The light emitting device 19 emits light in accordance with the electric signal 18, and an optical pattern 20 representing the results of the operation is thus radiated out of the light emitting device 19.

The operation means 17 may carry out simple addition and subtraction processing. Alternatively, the operation means 17 may carry out nonlinear processing, threshold value processing, or the like.

As in the first embodiment of the optical information processing system in accordance with the present invention, which is shown in FIG. 3, a plurality of the optical correlation operation means 3', 3', . . . having the functions described above are located in a one- or two-dimensional array together with the input information displaying means 2. In this manner, the constituent unit for an optical information processing system is formed. A plurality of the constituent units may be associated with one another such that the group of correlation information radiated out of a constituent unit may be successively given to a next constituent unit. In this manner, the optical information processing system in accordance with the present invention can be constructed.

Figure 12:
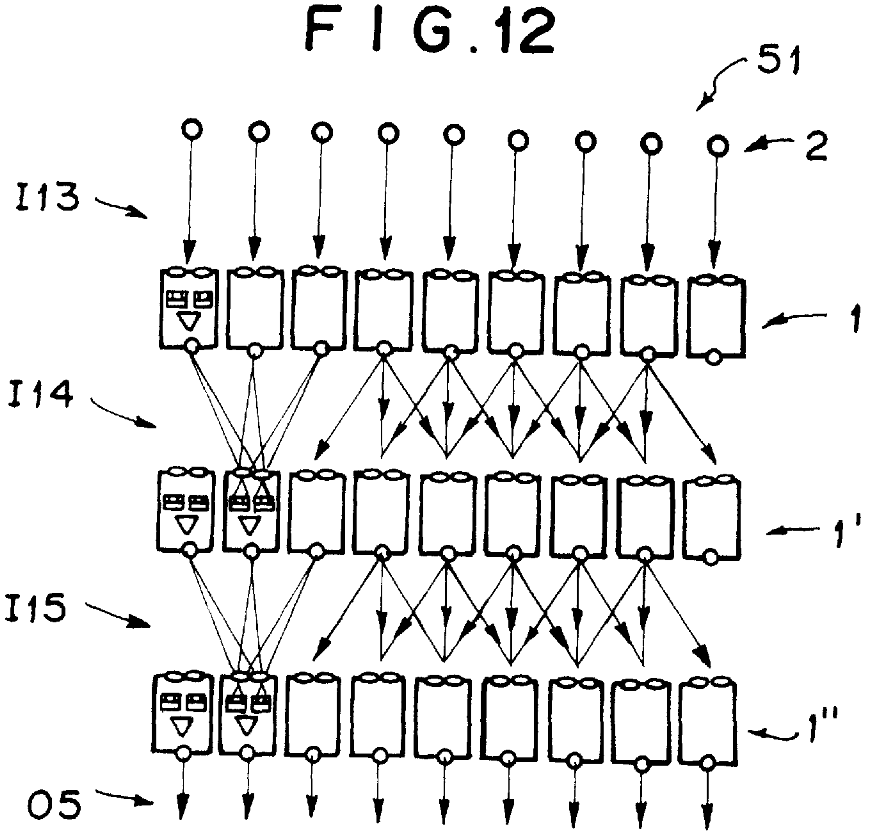
FIG. 12 is an explanatory view showing a fifth embodiment of the optical information processing system in accordance with the present invention.

FIG. 12 shows a fifth embodiment of the optical information processing system in accordance with the present invention. In this embodiment, three constituent units 1, 1', 1" for the optical information processing system 51, which utilize a plurality of the optical correlation operation means 3' are associated with each other.

As illustrated in FIG. 12, an optical information processing system 51, comprises the constituent units 1, 1', and 1" for the optical information processing system 51. The constituent units 1, 1', and 1" are associated with one another such that an optical pattern I14 radiated out of the constituent unit 1 may be given to the constituent unit 1', and an optical pattern I15 radiated out of the constituent unit 1' may be given to the constituent unit 1".

Optical pattern information I13 is radiated out of the input information displaying means 2. The optical pattern information I13 is given to the constituent unit 1 for the optical information processing system 51. The operation is carried out in the same manner as that described above, and an optical pattern I14 representing the results of the operation is radiated out of the constituent unit 1. The optical pattern I14 is given to the constituent unit 1' for the optical information processing system 51. The operation is carried out on the optical pattern I14 in the same manner as that in the constituent unit 1, and an optical pattern I15 representing the results of the operation is radiated out of the constituent unit 1'. The optical pattern I15 is then given to the constituent unit 1" for the optical information processing system 51, and an optical pattern O5 representing the final results of the operation is radiated out of the constituent unit 1".

With the optical information processing system 51, processing on the local information is carried out at any point in the constituent units 1, 1', and 1". Therefore, as in the first embodiment of the optical information processing system in accordance with the present invention, the distance between the adjacent constituent units 1, 1', 1" can be kept short, and the optical information processing system 51 can be kept compact. Also, even if the amount of the optical pattern information to be processed becomes large, processing can be carried out on the entire information. Further, no distortion occurs in the information corresponding to peripheral regions of the optical pattern, and the amount of light at the peripheral regions of the optical pattern does not become small.

In the fifth embodiment of the optical information processing system in accordance with the present invention, the fifth example of the optical correlation operation means is applied to the first embodiment of the optical information processing system in accordance with the present invention, which is shown in FIG. 3. The fifth example of the optical correlation operation means may also be applied to the second, third, or fourth embodiment of the optical information processing system in accordance with the present invention, which is shown in FIG. 4, FIG. 5, or FIG. 6.

In the aforesaid embodiments of the optical information processing system in accordance with the present invention, the optical pattern information is one- or two-dimensionally transferred and processed. Alternatively, the constituent units for the optical information processing system may be located in a three-dimensional array in order to constitute the optical information processing system. Embodiments of the optical information processing system in accordance with the present invention, wherein the constituent units for the optical information processing system are located in a three-dimensional array, will be described hereinbelow.

Figure 13:
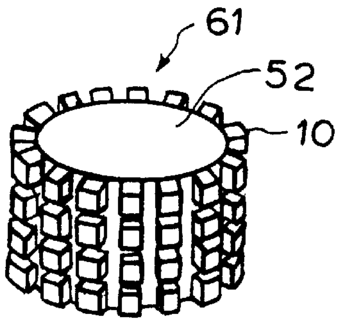
FIG. 13 is an explanatory view showing a third embodiment of the constituent unit for an optical information processing system in accordance with the present invention, wherein a plurality of optical correlation operation means are located along a cylindrical surface.

FIG. 13 is an explanatory view showing a third embodiment of the constituent unit for an optical information processing system in accordance with the present invention.

As illustrated in FIG. 13, the third embodiment of the constituent unit 61 for an optical information processing system in accordance with the present invention comprises a plurality of optical correlation operation means, which are located along a cylindrical surface.

With reference to FIG. 13, a constituent unit 61 for an optical information processing system comprises a plurality of the aforesaid first, second, third, or fourth example of optical correlation operation means, which are arrayed on an imaginary cylindrical surface 52. In the constituent unit 61 for the optical information processing system, the optical pattern information is given from the inward side of the cylindrical surface 52, and the optical pattern representing the results of the operation is fed out to the outward side of the cylindrical surface 52.

Figure 14:
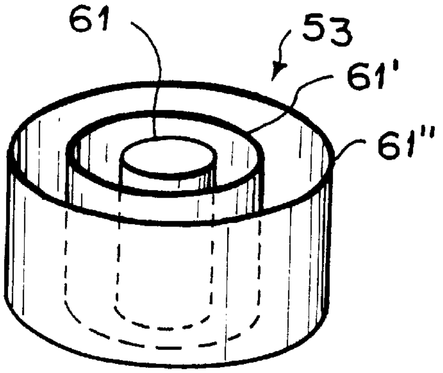
FIG. 14 is an explanatory view showing a sixth embodiment of the optical information processing system in accordance with the present invention, wherein a plurality of constituent units for the optical information processing system are combined together, each constituent unit comprising a plurality of optical correlation operation means, which are located along a cylindrical surface.

FIG. 14 is an explanatory view showing a sixth embodiment of the optical information processing system in accordance with the present invention, wherein a plurality of constituent units 61, 61', 61" for the optical information processing system 53 are combined together, each constituent unit 61, 61', 61" comprising a plurality of optical correlation operation means, which are located along a cylindrical surface. The plurality of the constituent units 61, 61', 61" having the cylindrical shapes with different sizes are concentrically combined with one another. In FIG. 14, as an aid in facilitating the explanation, the plurality of the optical correlation operation means are not shown. As illustrated in FIG. 14, an optical information processing system 53 comprises three constituent units 61, 61', and 61", which are located concentrically with respect to one another. The operation on the optical pattern information is carried out in each constituent unit, and the optical pattern representing the results of the operation is transferred to the constituent units which are located at the next stage. How the optical pattern is transferred in the optical information processing system 53 will be described hereinbelow with reference to FIG. 15.

Figure 15:
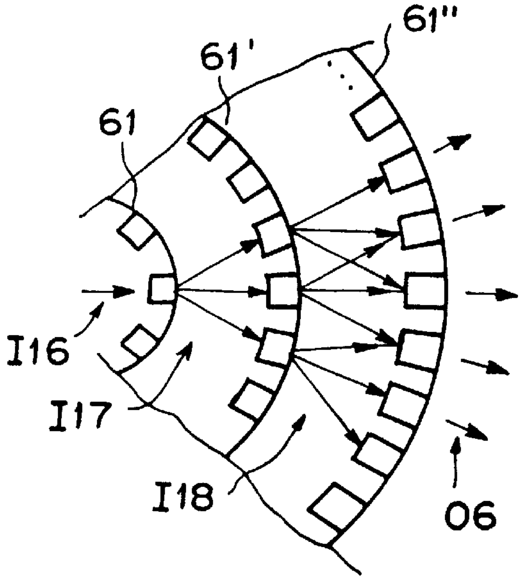
FIG. 15 is an enlarged view showing part of the sixth embodiment of the optical information processing system in accordance with the present invention.

As illustrated in FIG. 15, optical pattern information I16 is given to the constituent unit 61 for the optical information processing system. In each of the plurality of the optical correlation operation means of the constituent unit 61, the operation on the optical pattern information I16 is carried out in the same manner as that described above. An optical pattern I17 representing the results of the operation is radiated out of the constituent unit 61. The optical pattern I17 is given to the constituent unit 61' for the optical information processing system 53. Transfer of the optical pattern from each of the plurality of the optical correlation operation means of the constituent unit 61 for the optical information processing system 53 to the constituent unit 61' for the optical information processing system 53 is of the local area limited connection type. Specifically, the optical pattern is transferred from a certain single optical correlation operation means, which is among the plurality of the optical correlation operation means of the constituent unit 61 for the optical information processing system 53, only to the corresponding optical correlation operation means of the constituent unit 61' and to the optical correlation operation means of the constituent unit 61' located in the vicinity of the corresponding optical correlation operation means. Thereafter, each optical correlation operation means of the constituent unit 61' carries out the operation on the received optical pattern I17 and feeds out an optical pattern I18. The optical pattern I18 is then given to the constituent unit 61". In the constituent unit 61", the operation is carried out on the optical pattern I18 in the same manner as that described above. An optical pattern O6 representing the final results of the operation is thus radiated out of the constituent unit 61".

With the sixth embodiment of the optical information processing system in accordance with the present invention, the optical pattern information is fed from the inward side of the cylindrical surface, and the optical pattern representing the results of the operation is fed out to the outward side of the cylindrical surface. Alternatively, the optical information processing system may be constituted such that the optical pattern information may be fed from the inward side of the cylindrical surface, and the optical pattern representing the results of the operation may be fed out to the outward side of the cylindrical surface.

Also, the sixth embodiment of the optical information processing system in accordance with the present invention is constituted of the constituent units having the cylindrical shapes. However, the optical information processing system in accordance with the present invention may have any of other shapes, wherein the constituent units having a three-dimensional shape.

Figure 16:
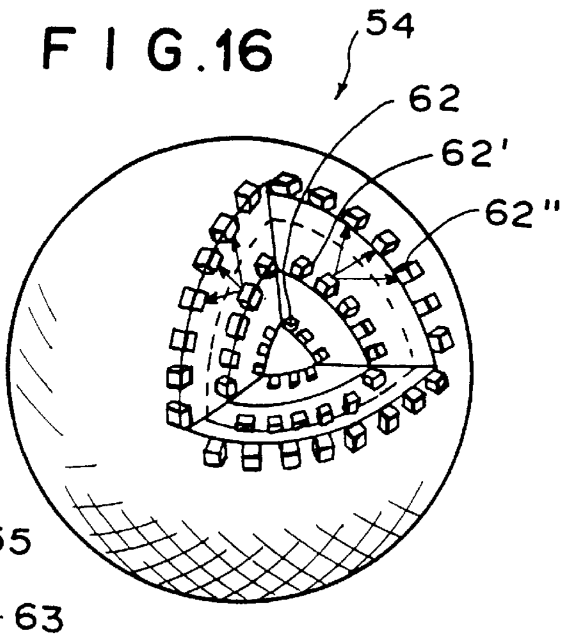
FIG. 16 is an explanatory view showing a seventh embodiment of the optical information processing system in accordance with the present invention, wherein a plurality of constituent units for the optical information processing system are combined together, each constituent unit comprising a plurality of optical correlation operation means, which are located along a spherical surface.

For example, as in a seventh embodiment of the optical information processing system in accordance with the present invention, which is shown in FIG. 16, a plurality of constituent units 62, 62', 62" for the optical information processing system 54 may be combined together such that each constituent unit 62, 62', 62" may comprise a plurality of optical correlation operation means, which are located along a spherical surface.

Specifically, as illustrated in FIG. 16, a constituent unit for the optical information processing system comprises a plurality of the aforesaid first, second, third, or fourth example of optical correlation operation means, which are arrayed on a spherical surface. A plurality of such constituent units are associated with one another, and the optical information processing system having the spherical shape is thereby obtained. As illustrated in FIG. 16, an optical information processing system 54 comprises three layers of constituent units 62, 62', and 62", each of which has the plurality of optical correlation operation means located along the spherical surface. Transfer of the optical pattern information is carried out in the same manner as that in the aforesaid embodiments of the optical information processing system in accordance with the present invention.

In the optical information processing system 54 shown in FIG. 16, the optical pattern may be transferred from the inner constituent unit 62 towards the outer constituent units 62' and 62". Alternatively, the optical pattern may be transferred from the outer constituent unit 62" towards the inner constituent units 62' and 62.

Also, as described above, in cases where a constituent unit is constituted of a plurality of the optical correlation operation means, which are arrayed along a cylindrical surface or a spherical surface, and the optical information processing system is constructed by combining a plurality of such constituent units, not only the information processing on a spatial domain but also the information processing on a polar coordinate system can be carried out.

Figure 17:
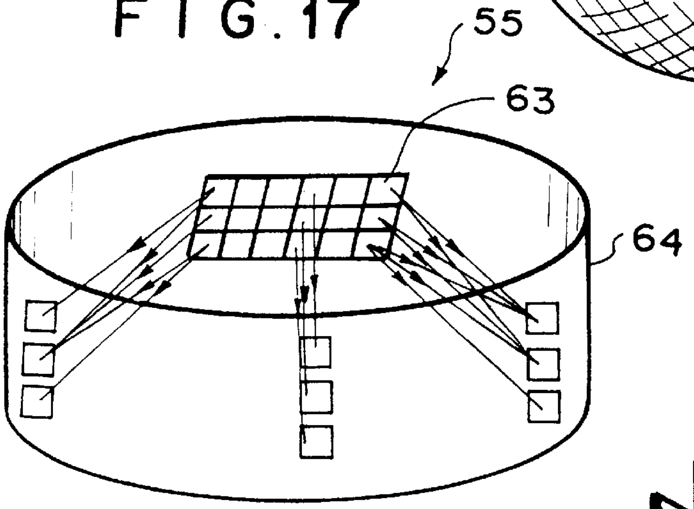
FIG. 17 is an explanatory view showing an eighth embodiment of the optical information processing system in accordance with the present invention, wherein a constituent unit comprising a plurality of optical correlation operation means, which are located along a cylindrical surface, is combined with a constituent unit comprising a plurality of optical correlation operation means, which are arrayed in two-dimensional directions.
Figure 18:
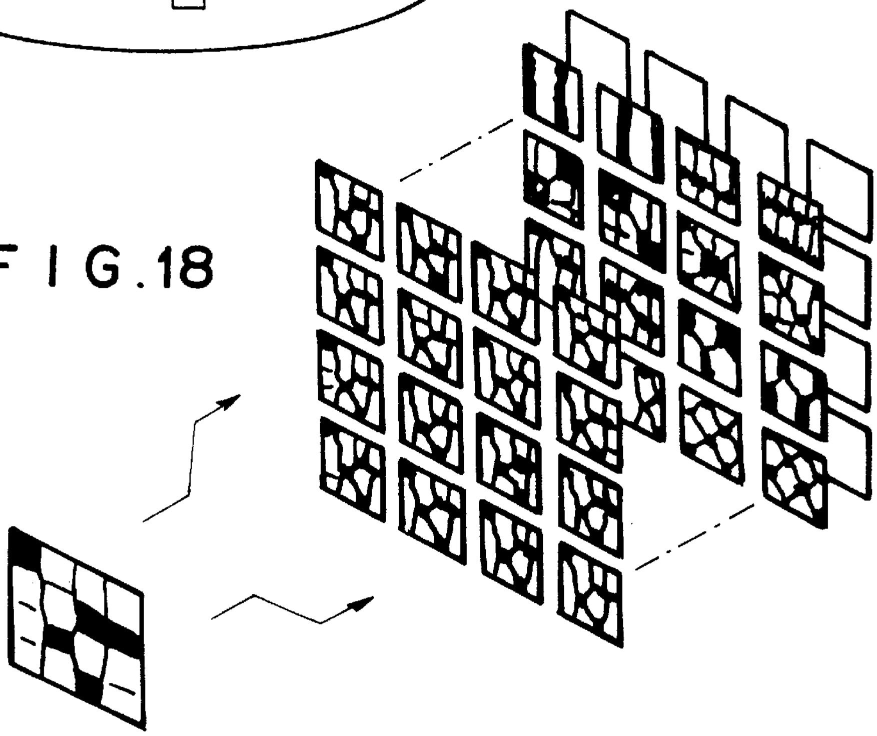
FIG. 18 is an explanatory view showing a multiple imaging optical system, which is one of basic components in optical parallel processing.
Figure 19:
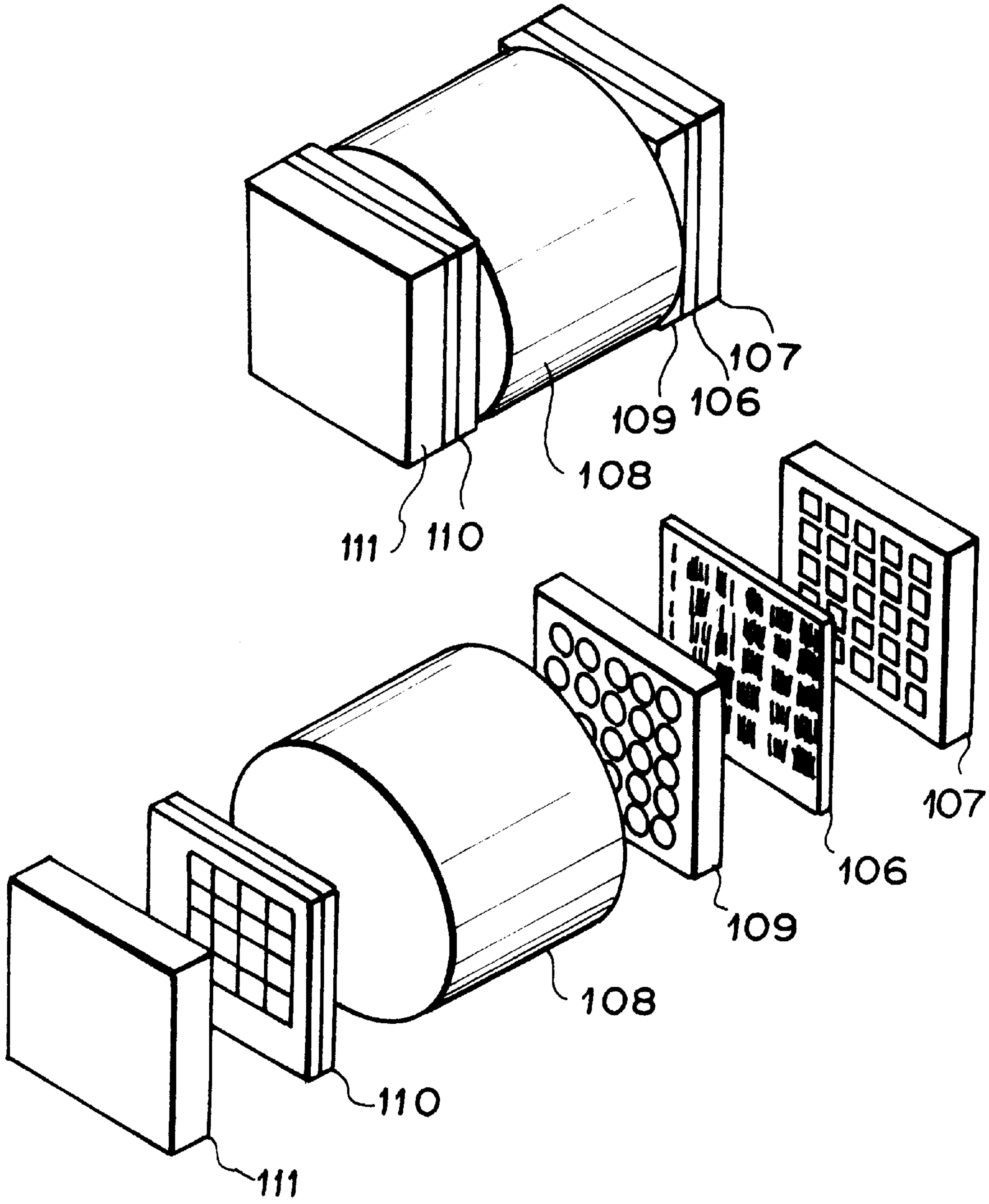
FIG. 19 PRIOR ART
FIG. 19 is a perspective view showing a conventional optical information transmitter.

FIG. 17 is an explanatory view showing an eighth embodiment of the optical information processing system in accordance with the present invention. As in the eighth embodiment, a constituent unit comprising a plurality of optical correlation operation means, which are located along a cylindrical surface, may be combined with a constituent unit comprising a plurality of optical correlation operation means, which are arrayed in a one-dimensional direction or in two-dimensional directions.

Specifically, as illustrated in FIG. 17, an optical information processing system 55 comprises a constituent unit 64 for the optical information processing system and a constituent unit 63, which are associated with each other. The constituent unit 64 for the optical information processing system comprises a plurality of the aforesaid first, second, third, or fourth example of optical correlation operation means, which are arrayed on a cylindrical surface. The constituent unit 63 comprises a plurality of the optical correlation operation means, which are arrayed in two-dimensional directions. Transfer of the optical pattern information is carried out in the same manner as that in the aforesaid embodiments of the optical information processing system in accordance with the present invention.

In the optical information processing system 55 shown in FIG. 17, the optical pattern is transferred from the inner constituent unit 63 towards the outer constituent unit 64. Alternatively, the optical pattern may be transferred from the outer constituent unit 64 towards the inner constituent unit 63.

As described above, in cases where the optical information processing system is constructed by combining the constituent unit, which is constituted of a plurality of the optical correlation operation means arrayed along a cylindrical surface or a spherical surface, and the constituent unit, which is constituted of a plurality of the optical correlation operation means located in a one- or two-dimensional array, the spatial-domain information can be processed by being transformed into information on a polar coordinate system.

In the embodiments described above, the optical information processing system is constructed by combining a plurality of the constituent units for the optical information processing system. Certain kinds of information processing (e.g., differentiation processing) can be carried out only with a single constituent unit. Therefore, in such cases, the optical information processing system may be constituted of a single constituent unit.

In the embodiments described above, addition and subtraction are carried out on the output obtained from the optical correlation operation means. Alternatively, any of other operations, such as multiplication, division, linear processing, and logical operations, may be carried out in accordance with the kind of the information processing.

In the fourth embodiment of the optical information processing system in accordance with the present invention, which is shown in FIG. 6, when the optical pattern having been radiated out of the constituent unit 1 is again fed into the constituent unit 1, the optical pattern is mixed with the optical pattern information, which is given from the input information displaying means 2 into the constituent unit 1. Alternatively, only the optical pattern having been radiated out of the constituent unit 1 may be again fed into the constituent unit 1.

In the embodiments described above, the optical pattern is fed out as the information representing the final results of the operation. Alternatively, the constituent unit for the optical information processing system, which comprises the optical correlation operation means shown in FIG. 9 or FIG. 10, may be employed at the final stage of the optical information processing system. In this manner, the information representing the final results of the operation may be obtained as an electric signal.

What is claimed is:

1. A constituent unit for an optical information processing system, comprising:

i) an input information displaying means for displaying information as an optical pattern in at least one dimension, ii) a plurality of optical correlation operation means, which are located close to said input information displaying means, wherein each of said plurality of said optical correlation operation means detects a respective portion of said optical pattern displayed by said input information displaying means, and wherein each of said lurality of said optical correlation operation means calculates a correlation value between said portion of said optical pattern and a predetermined value and outputs said correlation value, and iii) a plurality of electric operation means, wherein each of said plurality of said electric operation means inputs said correlation value output from at least one of said plurality of said optical correlation operation means, and wherein each of said plurality of said electric operation means performs an operation based on said correlation value input from said at least one of said optical correlation operation means and outputs a result of said operation.

2. A constituent unit as defined in claim 1 wherein each of said plurality of said optical correlation operation means comprises:

a) an optical mask for storing said predetermined value, wherein said optical mask has light transmission characteristics in accordance with said predetermined value;

b) an optical information transfer means for transferring said portion of said optical pattern to said optical mask, and c) a light receiving means for receiving a resultant optical pattern representing an optical intensity product of said portion of said optical pattern passing through said optical mask and said predetermined value stored in said optical mask, wherein said light receiving means detects a total optical intensity of said resultant optical pattern and generates an electric signal in accordance with said total optical intensity.

3. A constituent unit as defined in claim 2 wherein each of said plurality of said electric operation means comprises:

operation means for performing said operation on said electric signal generated from said light receiving means and an electric signal received from at least one other light receiving means of another of said plurality of said optical correlation operation means and for outputting a resultant electric signal based on said operation.

4. A constituent unit for an optical information processing system as defined in claim 1 wherein the constituent unit further comprises an optical signal group output means, which receives said result from at least one of said plurality of said electric operation means and outputs optical signals in accordance with said result.

5. An optical information processing system, comprising:

i) a constituent unit, wherein said constituent unit comprises a) an input information displaying means for displaying information as an optical pattern in at least one dimension, b) a plurality of optical correlation operation means, which are located close to said input information displaying means, wherein each of said plurality of said optical correlation operation means detects a respective portion of said optical pattern displayed by said input information displaying means, and wherein each of said plurality of said optical correlation operation means calculates a correlation value between said portion of said optical pattern and a predetermined value and outputs said correlation value, and c) a plurality of electric operation means, wherein each of said plurality of said electric operation means inputs said correlation value output from at least one of said plurality of said optical correlation operation means, and wherein each of said plurality of said electric operation means performs an operation based on said correlation value input from said at least one of said optical correlation operation means and outputs a result of said operation, d) an optical signal croup output means, which receives said result from at least one of said plurality of said electric operation means and outputs optical signals in accordance with said result;

ii) information mixing means for mixing said optical signals in a predetermined proportion into a mixed signal, so that said mixed signal can be input again to said constituent unit; and iii) information group re-entry means for inputting said mixed signal into said constituent unit again.

6. An optical information processing system as defined in claim 5, comprising:

a first constituent unit group, wherein said first constituent unit group comprises said constituent unit; and a second constituent unit group, wherein said second constituent unit group comprises another constituent unit, wherein group signals are either output from said first constituent unit group and input by said second constituent unit group or output by said second constituent unit group and input by said first constituent unit group.

7. An optical information processing system comprising:

a first constituent unit;

a second constituent unit, wherein said second constituent unit comprises:

i) a second input information displaying means for displaying second information as a second optical pattern in at least one dimension, ii) a plurality of second optical correlation operation means, which are located close to said second input information displaying means, wherein each of said plurality of said second optical correlation operation means detects a respective portion of said second optical pattern displayed by said second input information displaying means, and wherein each of said plurality of said second optical correlation operation means calculates a second correlation value between said portion of said second optical pattern and a predetermined value and outputs said second correlation value, and iii) a plurality of second electric operation means, wherein each of said plurality of said second operation means inputs said second correlation value output from at least one of said plurality of said second optical correlation operation means, and wherein each of said plurality of said second electric operation means performs a second operation based on said second correlation value input from said at least one of said second optical correlation operation means and outputs a second result of said second operation, iv) an optical signal group output means, which receives said second result from at least one of said plurality of said electric operation means and outputs optical signals in accordance with said second result wherein said first constituent unit and said second constituent unit are oriented such that said optical signals output by said second constituent unit may be input by said first constituent unit.

8. An optical information processing system, comprising:

a first constituent unit, wherein said first constituent unit comprises:

i) a first input information displaying means for displaying first information as a first optical pattern in at least one dimension, ii) a plurality of first optical correlation operation means, which are located close to said first input information displaying means, wherein each of said plurality of said first optical correlation operation means detects a respective portion of said first optical pattern displayed by said first input information displaying means, and wherein each of said plurality of said first optical correlation operation means respectively calculates a first correlation value between said portion of said first optical pattern and a predetermined value and outputs said first correlation value, and iii) a plurality of first electric operation means, wherein each of said plurality of said first operation means inputs said first correlation value output from at least one of said plurality of said first optical correlation operation means, and wherein each of said plurality of said first electric operation means performs a first operation based on said first correlation value input from said at least one of said first optical correlation operation means and outputs a first result of said first operation; and a second constituent unit, wherein said second constituent unit comprises:

i) a second input information displaying means for displaying second information as a second optical pattern in at least one dimension, ii) a plurality of second optical correlation operation means, which are located close to said second input information displaying means, wherein each of said plurality of said second optical correlation operation means detects a respective portion of said second optical pattern displayed by said second input information displaying means, and wherein each of said plurality of said second optical correlation operation means respectively calculates a second correlation value between said portion of said second optical pattern and a predetermined value and outputs said second correlation value, and iii) a plurality of second electric operation means, wherein each of said plurality of said second operation means inputs said second correlation value output from at least one of said plurality of said second optical correlation operation means, and wherein each of said plurality of said second electric operation means performs a second operation based on said second correlation value input from said at least one of said second optical correlation operation means and outputs a second result of said second operation;

iv) a second optical signal group output means, wherein said second optical signal group output means receives said second result from at least one of said plurality of said second electric operation means and outputs optical signals in accordance with said second result received from said at least one of said plurality of said second electric operation means.

9. An optical information processing system as defined in claim 8, wherein said first constituent unit and said second constituent unit are oriented such that said optical signals output from said second optical signal group output means may be input by said first constituent unit.

10. An optical information processing system as defined in claim 9, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

11. An optical information processing system as defined in claim 8, further comprising:

a plurality of constituent units, wherein said plurality of constituent units comprises said second constituent unit and at least a last constituent unit which is substantially identical to said second constituent unit, wherein said plurality of constituent units are associated with one another such that said optical signals output from one of said plurality of constituent units may be successively input by another of said plurality of constituent units, and wherein said first constituent unit inputs said optical signals output by said last constituent unit of said plurality of constituent units.

12. An optical information processing system as defined in claim 11, wherein each of said second optical signal group output means of more than one of said plurality of constituent units respectively serves as said second input information displaying means for an other of said plurality of constituent units.

13. An optical information processing system as defined in claim 12, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

14. An optical information processing system as defined in claim 11, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

15. An optical information processing system as defined in claim 8, further comprising:

a plurality of constituent units, wherein said plurality of constituent units comprises said first constituent unit and at least one additional constituent unit which is substantially identical to said first constituent unit, and wherein said second constituent unit is associated with said plurality of constituent units such that said optical signals output by said second constituent unit may be input in parallel into said plurality of constituent units.

16. An optical information processing system as defined in claim 15, wherein the second optical signal group output means of said second constituent unit also serves as said first input information displaying means of each of said plurality of constituent units, such that each of said plurality of constituent units receives said optical signals output by said second optical signal group output means.

17. An optical information processing system as defined in claim 16, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

18. An optical information processing system as defined in claim 15, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

19. An optical information processing system as defined in claim 8, further comprising:

a plurality of constituent units, wherein said plurality of constituent units comprises said second constituent unit and at least one additional constituent unit which is substantially identical to said second constituent unit, wherein said plurality of constituent units are associated with said first constituent unit such that said optical signals output by said plurality of constituent units may be input in parallel by said first constituent unit.

20. An optical information processing system as defined in claim 19, wherein each of said second optical signal group output means of each of said plurality of the constituent units also serves as said first input information displaying means of said first constituent unit, such that said first constituent unit receives said optical signals output by said second optical signal group output means of each of said plurality of constituent units.

21. An optical information processing system as defined in claim 20, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

22. An optical information processing system as defined in claim 19, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit group and input by said second constituent unit group or output by said second constituent unit group and input by said first constituent unit group.

23. An optical information processing system as defined in claim 8, wherein:

said first constituent unit and said second constituent unit are oriented such that said optical signals output from said second constituent unit may be input by said first constituent unit, and said second optical signal group output means of said second constituent unit also serves as said first input information displaying means of said first constituent unit such that said first constituent unit receives said optical signals output by said second optical signal group output means.

24. An optical information processing system as defined in claim 23, comprising:

a first constituent unit group, wherein said first constituent unit group comprises said first constituent unit and said second constituent unit, a second constituent unit group, wherein said second constituent unit group comprises a third constituent unit and wherein group signals are either output from said first constituent unit croup and input by said second constituent unit group or output by said second constituent unit group and input by said first constituent unit group.

25. An optical information processing system as defined in any of claims 6 7 10 13 14 17 18 21 22 and 24 further comprising:

a last stare constituent unit located at the last stage of the optical information processing system wherein said last stare constituent unit comprises:

i) a last input information displaying means for displaying information as a last optical pattern, ii) a plurality of last optical correlation operation means, which are located close to said last input information displaying means, wherein each of said plurality of said last optical correlation operation means detects a respective portion of said last optical pattern displayed by said last input information displaying means, and wherein each of said plurality of said last optical correlation operation means calculates a last correlation value between said portion of said last optical pattern and a last predetermined value and outputs said last correlation value, and iii) a plurality of last electric operation means, wherein each of said plurality of said last electric operation means inputs said last correlation value output from at least one of said plurality of said last optical correlation operation means, and wherein each of said plurality of said last electric operation means performs a last operation based on said last correlation value input from said at least one of said last optical correlation operation means and outputs a last result of said operation.

26. An optical information processing system as defined in claim 25 each of said plurality of said last optical correlation operation means comprises:

a) an last optical mask for storing said last predetermined value, wherein said last optical mask has light transmission characteristics in accordance with said last predetermined value;

b) a last optical information transfer means for transferring said portion of said last optical pattern to said last optical mask, and c) a last light receiving means for receiving a last resultant optical pattern representing an optical intensity product of said portion of said last optical pattern passing through said last optical mask and said last predetermined value stored in said last optical mask, wherein said last light receiving means detects a total optical intensity of said last resultant optical pattern and generates a last electric signal in accordance with said total optical intensity.

27. An optical information processing system as defined in claim 26 wherein each of said plurality of said last electric operation means comprises:

last operation means for performing said operation on said last electric signal generated from said last light receiving means and an electric signal received from at least one other last light receiving means of another of said plurality of said last optical correlation operation means and for outputting a last resultant electric signal based on said operation.

* * * * *